United States Patent
Shin et al.

(10) Patent No.: US 11,664,493 B2
(45) Date of Patent: May 30, 2023

(54) NEGATIVE ELECTRODE ACTIVE MATERIAL, NEGATIVE ELECTRODE INCLUDING THE SAME AND LITHIUM SECONDARY BATTERY INCLUDING THE SAME

(71) Applicant: LG CHEM, LTD., Seoul (KR)

(72) Inventors: Sun-Young Shin, Daejeon (KR);
Je-Young Kim, Daejeon (KR);
Yong-Ju Lee, Daejeon (KR);
Rae-Hwan Jo, Daejeon (KR);
Jung-Hyun Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 375 days.

(21) Appl. No.: 16/644,672

(22) PCT Filed: Jan. 31, 2019

(86) PCT No.: PCT/KR2019/001402
§ 371 (c)(1),
(2) Date: Mar. 5, 2020

(87) PCT Pub. No.: WO2019/151814
PCT Pub. Date: Aug. 8, 2019

(65) Prior Publication Data
US 2021/0111395 A1    Apr. 15, 2021

(30) Foreign Application Priority Data
Jan. 31, 2018  (KR) .................. 10-2018-0012300

(51) Int. Cl.
*H01M 4/131*    (2010.01)
*H01M 4/36*    (2006.01)
(Continued)

(52) U.S. Cl.
CPC .............. *H01M 4/366* (2013.01); *C01B 33/22* (2013.01); *H01M 4/131* (2013.01); *H01M 4/134* (2013.01);
(Continued)

(58) Field of Classification Search
CPC ...... H01M 4/366; H01M 4/131; H01M 4/134; H01M 4/136; H01M 4/364; H01M 4/386;
(Continued)

(56) References Cited

U.S. PATENT DOCUMENTS

2013/0309578 A1  11/2013  Umeno et al.
2016/0372753 A1  12/2016  Fukasawa et al.
(Continued)

FOREIGN PATENT DOCUMENTS

CN    107112499 A    8/2017
JP    2010-170943 A    8/2010
(Continued)

OTHER PUBLICATIONS

KR10-20170137000 translation (Year: 2017).*
(Continued)

*Primary Examiner* — Jane J Rhee
(74) *Attorney, Agent, or Firm* — Morgan, Lewis & Bockius LLP (57) ABSTRACT

Disclosed is a negative electrode active material which includes: secondary particles having a plurality of primary particles which include a silicon oxide composite including i) Si, ii) a silicon oxide represented by $SiO_x$ ($0<x≤2$), and iii) a metal silicate containing Si and M, wherein M is at least one of Li and Mg; and a first carbon coating layer disposed partially or totally on the surfaces of the primary particles to interconnect and fix the primary particles; and a second carbon coating layer disposed on the surfaces of the secondary particles, wherein the second carbon coating layer
(Continued)

has higher crystallinity as compared to the first carbon coating layer, and the primary particles have an average particle diameter ($D_{50}$) of 0.1-3.5 μm. A negative electrode including the negative electrode active material, and a lithium secondary battery including the negative electrode are also disclosed.

20 Claims, 2 Drawing Sheets

(51) Int. Cl.
  C01B 33/22     (2006.01)
  H01M 4/134     (2010.01)
  H01M 4/136     (2010.01)
  H01M 4/38      (2006.01)
  H01M 4/48      (2010.01)
  H01M 4/58      (2010.01)
  H01M 4/62      (2006.01)
  H01M 10/0525   (2010.01)
  H01M 4/02      (2006.01)

(52) U.S. Cl.
  CPC .......... *H01M 4/136* (2013.01); *H01M 4/364* (2013.01); *H01M 4/386* (2013.01); *H01M 4/483* (2013.01); *H01M 4/5825* (2013.01); *H01M 4/625* (2013.01); *H01M 10/0525* (2013.01); *C01P 2004/50* (2013.01); *C01P 2004/61* (2013.01); *C01P 2004/62* (2013.01); *C01P 2004/80* (2013.01); *C01P 2006/40* (2013.01); *H01M 2004/021* (2013.01); *H01M 2004/027* (2013.01)

(58) Field of Classification Search
  CPC .... H01M 4/483; H01M 4/5825; H01M 4/625; H01M 2004/021; H01M 2004/027; C01P 2004/50; C01P 2004/61; C01P 2004/62; C01P 2004/80; C01P 2006/40; C01B 33/22

See application file for complete search history.

(56) References Cited

U.S. PATENT DOCUMENTS

| | | |
|---|---|---|
| 2018/0040886 A1 | 2/2018 | Yokoi et al. |
| 2018/0090750 A1 | 3/2018 | Oh et al. |
| 2018/0342757 A1 | 11/2018 | Choi et al. |

FOREIGN PATENT DOCUMENTS

| | | | |
|---|---|---|---|
| JP | 2017-168406 | A | 9/2017 |
| KR | 10-2013-0142148 | A | 12/2013 |
| KR | 10-2014-0070162 | A | 6/2014 |
| KR | 10-1586816 | B1 | 1/2016 |
| KR | 10-2017-0126480 | A | 11/2017 |
| KR | 10-2017-0137000 | A | 12/2017 |
| WO | 2007/133005 | A1 | 11/2007 |
| WO | 2015/145521 | A1 | 10/2015 |

OTHER PUBLICATIONS

Extended Search Report issued from the European Patent Office dated Dec. 2, 2020 in a corresponding EP Patent Application No. 19747677.3.

"A Basic Guide to Particle Characterization," Malvern Instruments Worldwide, pp. 1-26 (2012), XP055089322.

Zhang et al., "Controlled synthesis of green and blue luminescent carbon nanoparticles with high yields by the carbonization of sucrose," New Journal of Chemistry, vol. 34, No. 4, pp. 591-593 (2010) XP055740137.

International Search Report (with partial translation) and Written Opinion issued in corresponding International Patent Application No. PCT/KR2019/001402, dated May 13, 2019.

* cited by examiner

NEGATIVE ELECTRODE ACTIVE MATERIAL, NEGATIVE ELECTRODE INCLUDING THE SAME AND LITHIUM SECONDARY BATTERY INCLUDING THE SAME

TECHNICAL FIELD

The present disclosure relates to a negative electrode active material, a negative electrode including the same and a lithium secondary battery including the same.

The present application claims priority to Korean Patent Application No. 10-2018-0012300 filed on Jan. 31, 2018 in the Republic of Korea, the disclosures of which including the specification and drawings are incorporated herein by reference.

BACKGROUND ART

Recently, as mobile instruments, personal computers, electric motors and contemporary capacitor devices have been developed and popularized, high-capacity energy sources have been in increasingly in demand. A typical example of such energy sources includes a lithium secondary battery. Silicon has been given much attention as a negative electrode material for a next-generation type non-aqueous electrolyte secondary battery, since it has a capacity (about 4200 mAh/g) corresponding to about 10 times or more of the capacity (theoretical capacity: 372 mAh/g) of a graphite-based material used conventionally as a negative electrode material. Thus, it has been suggested that silicon, which is alloyed with lithium and shows high theoretical capacity, is used as a novel negative electrode active material substituting for a carbonaceous material.

However, silicon undergoes volumetric swelling during charge and volumetric shrinking during discharge. For this, when a secondary battery is charged/discharged repeatedly, silicon used as a negative electrode active material is micronized and shows an increase in isolated particles that lose a conductive path in the electrode, resulting in degradation of the capacity of a secondary battery.

There has been an attempt to carry out micronization of silicon in order to improve cycle characteristics. As a result, it can be expected that cycle characteristics may be improved as micronization proceeds. However, there is a limitation in reducing the crystallite size of crystalline silicon. Thus, it is difficult to sufficiently solve the problem of micronization of silicon during charge/discharge.

As another method for improving cycle characteristics, use of silicon oxide ($SiO_x$) has been suggested. Silicon oxide ($SiO_x$) forms a structure in which silicon crystals having a size of several nanometers are dispersed homogeneously in silicon oxide, while it is decomposed into Si and $SiO_2$ by disproportionation at a high temperature of 1,000° C. or higher. It is expected that when applying such silicon oxide to a negative electrode active material for a secondary battery, the silicon oxide provides a low capacity corresponding to approximately a half of the capacity of a silicon negative electrode active material but shows a capacity approximately 5 times higher than the capacity of a carbonaceous negative electrode active material. In addition, it shows a small change in volume structurally during charge and discharge to provide excellent cycle life characteristics. However, silicon oxide undergoes reaction with lithium upon the initial charge to produce lithium silicide and lithium oxide (lithium oxide and lithium silicate). Particularly, lithium oxide cannot participate in the subsequent electrochemical reaction and a part of lithium transported to a negative electrode upon the initial charge cannot be returned to a positive electrode, and thus irreversible reaction occurs. In the case of silicon oxide, it shows high irreversible capacity as compared to the other silicon-based negative electrodes and provides a significantly low initial charge efficiency (ICE, ratio of initial discharge capacity to charge capacity) of 70-75%. Such low initial efficiency requires excessive capacity of a positive electrode, when manufacturing a secondary battery, to cause a setoff of the capacity per unit weight of a negative electrode.

Therefore, there still has been a need for developing a silicon oxide-based material which reduces production of lithium oxide causing such irreversibility, and thus can satisfy life characteristics as well as initial capacity/efficiency, when using silicon oxide as a negative electrode active material.

DISCLOSURE

Technical Problem

The present disclosure is directed to providing a negative electrode active material having excellent life characteristics, a negative electrode including the same and a lithium secondary battery including the same. These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a negative electrode active material according to any one of the following embodiments.

According to the first embodiment, there is provided a negative electrode active material which includes:

secondary particles having a plurality of primary particles which include a silicon oxide composite including i) Si, ii) a silicon oxide represented by $SiO_x$ ($0<x≤2$), and iii) a metal silicate containing Si and M, wherein M is at least one of Li and Mg; and a first carbon coating layer disposed partially or totally on the surfaces of the primary particles to interconnect and fix the primary particles; and a second carbon coating layer disposed on the surfaces of the secondary particles, wherein the second carbon coating layer has higher crystallinity as compared to the first carbon coating layer, and the primary particles have an average particle diameter ($D_{50}$) of 0.1-3.5 μm.

According to the second embodiment, there is provided the negative electrode active material as defined in the first embodiment, wherein the full width at half-maximum (FWHM) value of D band of the first carbon coating layer is at least 1.3 times larger than the FWHM value of D band of the second carbon coating layer.

According to the third embodiment, there is provided the negative electrode active material as defined in the first or the second embodiment, which has an average particle diameter ($D_{50}$) of 5-15 μm.

In another aspect of the present disclosure, there is provided a method for preparing a negative electrode active material as defined in any one of the following embodiments.

According to the fourth embodiment, there is provided a method for preparing a negative electrode active material, including the steps of:

preparing a plurality of primary particles which include a silicon oxide composite including i) Si, ii) a silicon oxide represented by $SiO_x$ ($0<x\leq2$), and iii) a metal silicate containing Si and M, wherein M is at least one of Li and Mg;

mixing and firing the primary particles with a first carbonaceous material to prepare secondary particles having a first carbon coating layer disposed partially or totally on the surfaces of the primary particles to interconnect and fix the primary particles; and injecting a second carbonaceous material gas to the secondary particles and carrying out heat treatment at 850-1,150° C. for 30 minutes to 8 hours to form a second carbon coating layer surrounding the secondary particles.

According to the fifth embodiment, there is provided the method for preparing a negative electrode active material as defined in the fourth embodiment, wherein the step of preparing a plurality of primary particles includes the steps of: carrying out reaction of $SiO_x$ ($0<x\leq2$) gas with at least one metal gas selected from Li and Mg, and cooling the reaction mixture at 400-900° C. to deposit a silicon oxide composite; and pulverizing the deposited silicon oxide composite.

According to the sixth embodiment, there is provided the method for preparing a negative electrode active material as defined in the fourth or the fifth embodiment, wherein the $SiO_x$ ($0<x<2$) gas is prepared by allowing Si and $SiO_2$ to evaporate at 1,000-1,800° C., and the metal gas is prepared by allowing at least one metal selected from Li and Mg to evaporate at 800-1,600° C.

According to the seventh embodiment, there is provided the method for preparing a negative electrode active material as defined in any one of the fourth to the sixth embodiments, wherein the step of mixing and firing the primary particles with the first carbonaceous material includes the steps of: mixing the primary particles with the first carbonaceous material to form secondary particle shapes and carrying out low-temperature heat treatment at 600-700° C. for 2-6 hours; and carbonizing the low-temperature heat treated product under nitrogen atmosphere at a temperature of 900-1,200° C. for 0.5-8 hours.

In still another aspect of the present disclosure, there is also provided a negative electrode as defined in the following embodiment.

According to the eighth embodiment, there is provided a negative electrode including: a negative electrode current collector; and a negative electrode active material layer including the negative electrode active material as defined in any one of the first to the third embodiments, disposed on at least one surface of the negative electrode current collector.

In yet another aspect of the present disclosure, there is also provided a lithium secondary battery as defined in the following embodiment.

According to the ninth embodiment, there is provided a lithium secondary battery including the negative electrode as defined in the eighth embodiment.

Advantageous Effects

According to the present disclosure, it is possible to provide a negative electrode active material including a silicon oxide-based material which reduces production of lithium oxide causing the above-mentioned irreversibility, when using silicon oxide as a negative electrode active material, and thus can provide excellent life characteristics even after charge/discharge for a long time, as well as improved initial capacity/efficiency.

In addition, the negative electrode active material according to the present disclosure has a first inner carbon coating layer and a second outer carbon coating layer, wherein the second carbon coating layer has relatively higher crystallinity, thereby providing excellent electrical conductivity.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, the shape, dimension, scale or proportion of an element in the accompanying drawings may be exaggerated for the purpose of clearer description.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part ⌈includes⌋ an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

The present disclosure relates to a negative electrode for an electrochemical device and an electrochemical device including the same. Herein, the electrochemical device includes any device which carries out electrochemical reaction, and particular examples thereof include all types of primary batteries, secondary batteries, fuel cells, solar cells or capacitors. Particularly, among the secondary batteries, lithium secondary batteries, including lithium metal secondary batteries, lithium ion secondary batteries, lithium polymer secondary batteries or lithium ion polymer batteries, are preferred.

Hereinafter, the negative electrode active material according to the present disclosure will be explained in more detail.

Negative Electrode Active Material

The negative electrode active material according to an embodiment of the present disclosure includes:

secondary particles having a plurality of primary particles which include a silicon oxide composite including i) Si, ii) a silicon oxide represented by $SiO_x$ ($0<x\leq2$), and iii) a metal silicate containing Si and M, wherein M is at least one of Li and Mg; and a first carbon coating layer disposed partially or totally on the surfaces of the primary particles to interconnect and fix the primary particles; and a second carbon coating layer disposed on the surfaces of the secondary particles, wherein the second carbon coating layer has higher crystallinity as compared to the first carbon coating layer, and the primary particles have an average particle diameter ($D_{50}$) of 0.1-3.5 μm.

The negative electrode active material includes secondary particles corresponding to a core portion and a second carbon coating layer corresponding to s shell portion partially or totally surrounding the outside of the core portion, wherein the secondary particles have a plurality of primary particles including a silicon oxide composite and a first carbon coating layer disposed partially or totally on the surfaces of the primary particles to interconnect and fix the primary particles.

Figure 1:
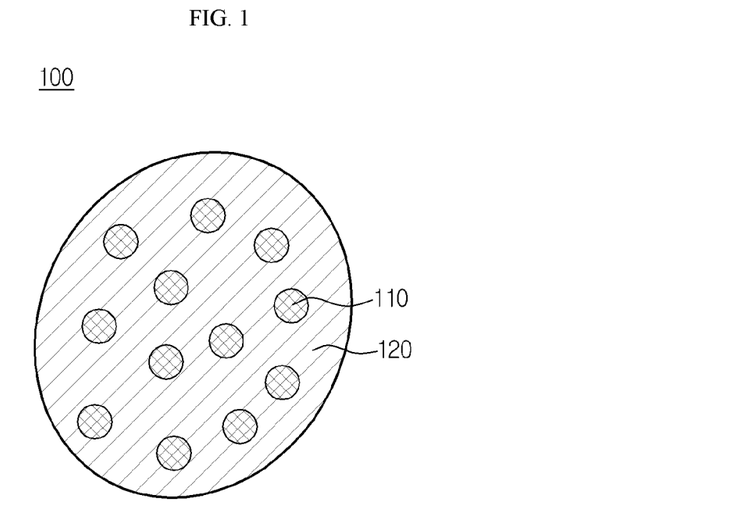
FIG. 1 is a schematic view illustrating the primary particles according to an embodiment of the present disclosure.

Referring to FIG. 1, the primary particles 100 according to an embodiment of the present disclosure include a plurality of silicon phases 110 including crystalline silicon, and the silicon phases may be dispersed/distributed homogeneously in a matrix 120 including the metal-containing silicon oxide composite.

According to an embodiment of the present disclosure, the silicon phases may be embedded/buried in the matrix. The silicon phase is a group formed by assemblage of one or more silicon crystals, and a single group may be present or two or more groups may be present.

The silicon phase may have a crystallite size of about 15 nm or less.

Figure 2:
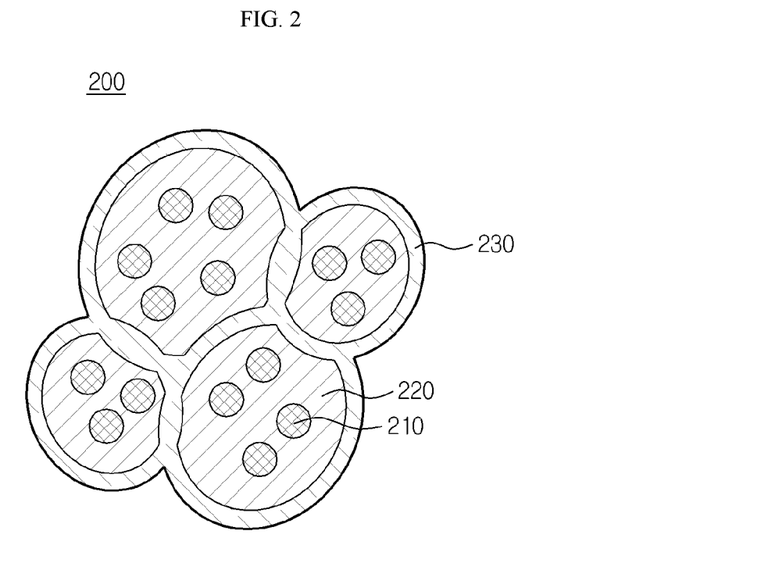
FIG. 2 is a schematic view illustrating the secondary particles according to an embodiment of the present disclosure.

Referring to FIG. 2, the secondary particles 200 according to an embodiment of the present disclosure have a plurality of primary particles which include a matrix 220 including a metal-containing silicon oxide composite in which a plurality of silicon phases 210 containing crystalline silicon are dispersed, and a first carbon coating layer 230 disposed partially or totally on the surfaces of the primary particles to interconnect and fix the primary particles.

Figure 3:
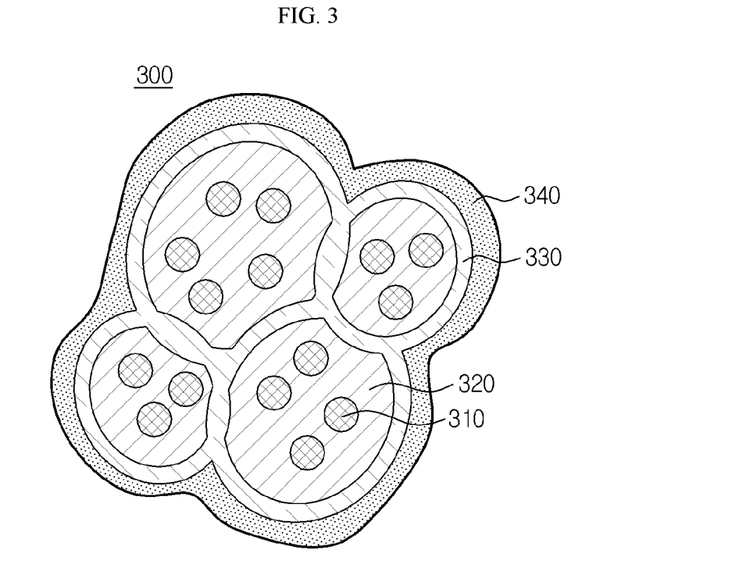
FIG. 3 is a schematic view illustrating the negative electrode active material according to an embodiment of the present disclosure.

Referring to FIG. 3, the negative electrode active material 300 according to an embodiment of the present disclosure includes a second carbon coating layer 340 disposed on the surfaces of the above-described secondary particles, i.e. secondary particles having a plurality of primary particles which include a matrix 320 including a metal-containing silicon oxide composite in which a plurality of silicon phases 310 containing crystalline silicon are dispersed, and a first carbon coating layer 330 disposed partially or totally on the surfaces of the primary particles to interconnect and fix the primary particles.

According to the present disclosure, the crystallinity of each of the carbon coating layers may be determined through the comparison of full width at half-maximum (FWHM) values of G band and D band in Raman spectroscopy.

Raman spectroscopy is a method for analyzing the structures of the first carbon coating layer and the second carbon coating layer. In the Raman spectrum of a carbon coating layer, the peak present in a wave number region of about 1580 $cm^{-1}$ is called G band, which is a peak representing the $sp^2$ binding of the carbon coating layer and shows carbon crystals having no structural defects. Meanwhile, in the Raman spectrum, the peak present in a wave number region of about 1360 $cm^{-1}$ is called D band, which is a peak representing the $sp^3$ binding of the carbon coating layer and is increased when an atomic bond formed by $sp^2$ binding is cleaved and converted into $sp^3$ binding. Such D band is increased when disorders or defects are generated in the carbon coating layer.

According to the present disclosure, G band of the Raman spectrum of the carbon coating layer may be a peak present in a wave number region of 1550 $cm^{-1}$ to 1620 $cm^{-1}$, and D band may be a peak present in a wave number region of 1330 $cm^{-1}$ to 1370 $cm^{-1}$. The wave number regions of G band and D band correspond to regions which can be shifted according to a laser beam source used for Raman spectroscopy. Although the Raman values used herein is not particularly limited, it may be determined by using DXR Raman Microscope (Thermo Electron Scientific Instruments LLC) at a laser wavelength of 532 nm.

According to an embodiment of the present disclosure, the FWHM value of D band in the Raman spectroscopy of the first carbon coating layer is at least 1.3 times, particularly 1.3-3 times, and more particularly 1.3-2 times larger than the FWHM value of D band in the Raman spectroscopy of the second carbon coating layer. When the ratio of the FWHM value of D band in the Raman spectroscopy of the first carbon coating layer to the FWHM value of D band in the Raman spectroscopy of the second carbon coating layer satisfies the above-defined range, a larger amount of defects are generated in the first carbon coating layer, and thus the crystallinity of the second carbon coating layer is higher than that of the first carbon coating layer. Thus, the first carbon coating layer is relatively harder so that it may support the primary particles more firmly during Li ion intercalation/deintercalation to inhibit deformation of the particles. In addition, the second carbon coating layer has relatively high crystallinity, and thus it improve the conductivity of silicon oxide particles, thereby improving the overall life characteristics of a battery.

According to an embodiment of the present disclosure, the first carbon coating layer having relatively lower crystallinity may be formed by mixing and firing a plurality of primary particles including the silicon oxide composite with an amorphous carbonaceous material.

For example, the amorphous carbonaceous material may be obtained from at least one amorphous carbon precursor selected from the group consisting of a hard carbon material, such as sucrose, phenolic resin, naphthalene resin, polyvinyl alcohol resin, furfuryl alcohol resin, polyacrylonitrile resin, polyamide resin, furan resin, cellulose resin, styrene resin, polyimide resin, epoxy resin or vinyl chloride resin; and a soft carbon material, such as coal pitch, petroleum pitch, polyvinyl chloride, mesophase pitch, tar or heavy oil, but is not limited thereto.

Meanwhile, according to an embodiment of the present disclosure, the second carbon coating layer having relatively higher crystallinity may be formed through chemical vapor deposition (CVD) by injecting a carbonaceous material gas to the secondary particles and carrying out heat treatment.

According to an embodiment of the present disclosure, the matrix contained in the primary particles is an ingredient inactive to Li and causes no Li intercalation/deintercalation during the charge of a battery. Although Si forms a composite with Li to contribute to charge/discharge of a battery, it has a problem of a severe change in volume during charge/discharge. To solve the problem, a negative electrode material using microcrystalline Si or a composite of Si with $SiO_2$ has been developed. However, $SiO_2$ forms $LiO_2$ or Li—S—O during the initial charge to generate irreversible capacity undesirably. Thus, the present disclosure has paid attention to reducing generation of such initial irreversible capacity by incorporating a metal element having binding force equal to or higher than the binding force of Li with oxygen into the matrix.

According to the present disclosure, the silicon oxide composite includes: i) Si, ii) a silicon oxide represented by $SiO_x$ ($0<x\leq2$); and iii) metal silicate including Si and M, wherein M is at least one of Li and Mg. The metal silicate includes $Mg_2SiO_4$ and $MgSiO_3$, for example.

Further, according to an embodiment of the present disclosure, the content of the first carbon coating layer is 3-15 parts by weight, particularly 3-10 parts by weight, and more particularly 3-8 parts by weight, based on 100 parts by weight of the primary particles. When the content of the first carbon coating layer satisfies the above-defined range, it can function as a binder with which the primary particles are bound firmly among themselves to form secondary particles, can improve the conductivity of an electrode, and can improve the capacity and efficiency of a battery, when it is applied to a negative electrode active material for a secondary battery.

In the silicon oxide composite, the metal silicate and silicon oxide are present in such a state that the elements of each phase are diffused so that the boundary surface of one phase is bound to that of another phase (i.e., the phases are bound to each other in an atomic level), and thus undergo little change in volume during lithium ion intercalation/deintercalation and cause no cracking of silicon oxide-based composite particles even after repeating charge/discharge.

According to an embodiment of the present disclosure, at least one metal of Li and Mg may be present in an amount of 3-20 wt %, particularly 4-15 wt %, based on 100 wt % of the silicon oxide composite. When the metal content satisfies the above-defined range, it is possible to improve initial efficiency and discharge capacity, when it is applied to a negative electrode active material for a secondary battery.

The primary particles according to the present disclosure may have a 50% particle diameter ($D_{50}$) of 0.1-3.5 µm, particularly 0.5-3 µm in the volume accumulated particle size distribution of the particles. The 50% particle diameter in the volume accumulated size distribution may be determined from accumulated frequency by using a laser diffraction particle size distribution analyzer available from Nikkiso Company.

Hereinafter, the method for preparing the negative electrode active material according to the present disclosure will be explained.

Method for Preparing Negative Electrode Active Material

The method for preparing a negative electrode active material according to an embodiment of the present disclosure includes the steps of:

preparing a plurality of primary particles which include a silicon oxide composite including i) Si, ii) a silicon oxide represented by $SiO_x$ ($0<x\leq2$), and iii) a metal silicate containing Si and M, wherein M is at least one of Li and Mg;

mixing and firing the primary particles with a first carbonaceous material to prepare secondary particles having a first carbon coating layer disposed partially or totally on the surfaces of the primary particles to interconnect and fix the primary particles; and injecting a second carbonaceous material gas to the secondary particles and carrying out heat treatment at 850-1,150° C. for 30 minutes to 8 hours to form a second carbon coating layer surrounding the secondary particles.

Herein, the step of preparing a plurality of primary particles includes the steps of: carrying out reaction of $SiO_x$ ($0<x<2$) gas with at least one metal gas selected from Li and Mg, and cooling the reaction mixture at 400-900° C. to deposit a silicon oxide composite; and pulverizing the deposited silicon oxide composite.

In addition, the $SiO_x$ ($0<x<2$) gas may be prepared by allowing Si and $SiO_2$ to evaporate at 1,000-1,800° C., and the metal gas may be prepared by allowing at least one metal selected from Li and Mg to evaporate at 800-1,600° C.

The reaction of $SiO_x$ ($0<x<2$) gas with at least one metal gas of Li and Mg may be carried out at 800-1,800° C. Then, quenching may be carried out to a target cooling temperature of 400-900° C., particularly 500-800° C., within 1-6 hours. When the quenching time satisfies the above-defined range after the vapor phase reaction of $SiO_x$ ($0<x<2$) gas with the metal gas, such quenching to a low temperature within a short time can solve the problem of insufficient reaction of metal with $SiO_x$ which results in a failure in formation of silicate and a residual undesired phase, such as MgO. As a result, it is possible to significantly improve the initial efficiency and an effect of preventing swelling, thereby providing significantly improved life of a battery.

After cooling, heat treatment may be further carried out, wherein the size of Si crystallites and metal silicate proportion may be controlled depending on heat treatment temperature. For example, when the additional heat treatment is carried out at high temperature, $Mg_2SiO_4$ phase may be increased and the Si crystallite size may be increased.

According to an embodiment of the present disclosure, the deposited silicon oxide composite may include crystalline silicon phases and a matrix in which the silicon phases are scattered, wherein the matrix includes metal (at least one metal of Li and Mg)-silicate and silicon-oxide. In addition, it is possible to form the silicon phases and matrix into a size corresponding to microcrystals of about 100 nm or less, particularly 40-50 nm, by selecting a composition similar to the composition at the eutectic point.

Next, the silicon oxide composite may be pulverized through a mechanical milling process, or the like, to obtain primary particles including silicon oxide composite powder having a particle diameter ($D_{50}$) of 0.1-20 µm.

Then, the primary particles are mixed and fired with a first carbonaceous material to prepare secondary particles having a first carbon coating layer disposed partially or totally on the surfaces of the primary particles to interconnect and fix the primary particles.

This step may include the steps of: mixing the primary particles with the first carbonaceous material to form secondary particle shapes and carrying out low-temperature heat treatment at 600-700° C. for 2-6 hours; and carbonizing the low-temperature heat treated product under nitrogen atmosphere at a temperature of 900-1,200° C. for 0.5-8 hours.

For example, the first carbonaceous material may be obtained from at least one amorphous carbon precursor selected from the group consisting of a hard carbon material, such as sucrose, phenolic resin, naphthalene resin, polyvinyl alcohol resin, furfuryl alcohol resin, polyacrylonitrile resin, polyamide resin, furan resin, cellulose resin, styrene resin, polyimide resin, epoxy resin or vinyl chloride resin; and a soft carbon material, such as coal pitch, petroleum pitch, polyvinyl chloride, mesophase pitch, tar or heavy oil, but is not limited thereto.

Herein, when mixing the primary particles with the first carbonaceous material, a mechanical mixing process may be used largely. Particular examples of the mechanical mixing process include a kneading process, a mechanical mixing process in which the blade structure of a mixer is modified so that shear stress may be applied upon mixing, or a mechanochemical process of applying shear force mechanically between materials to induce fusion between material surfaces.

Particularly, the primary particles are mixed with the first carbonaceous material to form secondary particle shapes. Herein, in order to realize formation of secondary particles and to impart a coating effect, a step of shaping particles may be carried out in a system equipped with rotation blades and an exhaust member so that the primary particles and the first carbonaceous material (amorphous carbon, etc.) may agglomerate well to form secondary particles, while low-temperature heat treatment is performed at 600-700° C. for 2-6 hours.

Then, the low-temperature heat treated product may be carbonized under nitrogen atmosphere at a temperature of 900-1,200° C. for 0.5-8 hours to prepare secondary particles having the first carbon coating layer.

After that, a carbonaceous material gas, such as methane gas, is injected to the resultant secondary particles and heat treatment is carried out in a rotary tubular furnace to form a second carbon coating layer as a shell portion on the surfaces of the secondary particles corresponding to a core portion. The second carbon coating layer may include a carbonaceous material resulting from the heat treatment of the carbonaceous material gas, such as methane. Particularly, the second carbon coating layer may be formed by introducing the core portion particles to a rotary tubular furnace, allowing argon gas to flow therethrough, increasing the temperature to 800-1,150° C. at a rate of about 5° C./min, and carrying out heat treatment for 30 minutes to 8 hours, while the rotary tubular furnace is rotated and argon gas (or mixed gas of argon gas with hydrogen gas) and the carbonaceous material gas are allowed to flow therethrough.

Negative Electrode

The negative electrode according to the present disclosure may be obtained by applying and drying a mixture of a negative electrode active material, a conductive material and a binder on a negative electrode current collector. If desired, the mixture may further include a filler. The negative electrode active material includes the above-described negative electrode material having a core-shell structure.

According to the present disclosure, the current collector is formed to have a thickness of 3-500 µm. The current collector is not particularly limited, as long as it causes no chemical change in the corresponding battery and has high conductivity. Particular examples of the current collector may include stainless steel, aluminum, nickel, titanium, baked carbon, aluminum or stainless steel surface-treated with carbon, nickel, titanium or silver, or the like. A suitable current collector may be selected depending on the polarity of a positive electrode or negative electrode.

The binder is an ingredient which assists binding between the electrode active material and the conductive material and binding to the current collector. In general, the binder is added in an amount of 1-50 wt % based on the total weight of the electrode mixture. Particular examples of the binder include polyacylonitrile-co-acrylate, polyvinylidene fluoride, polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, ethylene-propylene-diene terpolymer (EPDM), sulfonated EPDM, styrene butadiene rubber (SBR), polyacrylic acid, polyacrylic acid substituted with an alkali cation or ammonium ion, poly(alkylene-co-maleic anhydride) substituted with an alkali cation or ammonium ion, poly(alkylene-co-maleic acid) substituted with an alkali cation or ammonium ion, polyethylene oxide, fluororubber, or a combination thereof. More particularly, the polyacrylic acid substituted with an alkali cation or ammonium ion may be exemplified by lithium-polyacrylic acid (Li-PAA, lithium-substituted polyacrylic acid), and the poly(alkylene-co-maleic anhydride) substituted with an alkali cation or ammonium ion may be exemplified by lithium-substituted polyisobutylene-co-maleic anhydride.

The conductive material is an ingredient causing no chemical change in the corresponding battery. Particular examples of the conductive material include: graphite, such as natural graphite or artificial graphite; carbon black, such as carbon black, acetylene black, Ketjen black (trade name), carbon nanotubes, carbon nanofibers, channel black, furnace black, lamp black or thermal black; conductive fibers, such as carbon fibers or metallic fibers; fluorocarbon; metal powder such as aluminum or nickel powder; conductive whisker, such as zinc oxide or potassium titanate; conductive metal oxide, such as titanium oxide; and conductive materials, such as polyphenylene derivatives.

According to an embodiment of the present disclosure, when manufacturing a negative electrode by applying a mixture of the negative electrode active material, conductive material and the binder on the negative electrode current collector, the negative electrode may be obtained through a dry process by directly applying a solid mixture including the negative electrode active material, conductive material and the binder. Otherwise, the negative electrode may be obtained through a wet process by adding the negative electrode active material, conductive material and the binder to a dispersion medium, followed by agitation, applying the resultant mixture in the form of slurry, and removing the dispersion medium through drying, or the like. Herein, particular examples of the dispersion medium used for a wet process may include an aqueous medium, such as water (deionized water, or the like), or an organic medium, such as N-methyl-2-pyrrolidone (NMP) or acetone.

Lithium Secondary Battery

In another aspect, there is provided a lithium secondary battery including a positive electrode, the negative electrode according to the present disclosure and a separator interposed between the negative electrode and the positive electrode.

The positive electrode may be obtained by applying and drying a mixture of a positive electrode active material, a conductive material and a binder on a positive electrode current collector. If desired, the mixture may further include a filler. Particular examples of the positive electrode active material include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of LiMn$_{2-x}$M$_x$O$_2$ (wherein M=Co, Ni, Fe, Cr, Zn or Ta, and x=0.01-0.1) or Li$_2$Mn$_3$MO$_8$ (wherein M=Fe, Co, Ni, Cu or Zn); LiMn$_2$O$_4$ in which Li is partially substituted with an alkaline earth metal ion; disulfide compounds; Fe$_2$(MoO$_4$)$_3$; or the like.

The conductive material, current collector and the binder used for the positive electrode may refer to those described hereinabove with reference to the negative electrode.

The separator is interposed between the positive electrode and the negative electrode, and may be an insulating thin film having high ion permeability and mechanical strength. In general, the separator may have a pore diameter and thickness of 0.01-10 μm and 5-300 μm, respectively. Particular examples of the separator include: olefinic polymers, such as polypropylene having chemical resistance and hydrophobicity; films, sheets or non-woven webs made of glass fibers or polyethylene; or the like. Meanwhile, the separator may further include a porous layer containing a mixture of inorganic particles with a binder resin, on the outermost surface thereof.

According to the present disclosure, the electrolyte includes an organic solvent and a predetermined amount of lithium salt. Particular examples of the organic solvent include propylene carbonate (PC), ethylene carbonate (EC), butylene carbonate (BC), diethyl carbonate (DEC), dimethyl carbonate (DMC), dipropyl carbonate (DPC), methyl propionate (MP), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, butyl propionate, or a combination thereof. In addition, halogen derivatives of the organic solvents and linear ester compounds may also be used. The lithium salt is an ingredient easily soluble in the non-aqueous electrolyte, and particular examples thereof include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, lithium chloroborate, lower aliphatic lithium carbon/late, lithium tetraphenylborate, lithium imides, or the like.

The secondary battery according to the present disclosure may be obtained by receiving and sealing an electrode assembly including positive electrodes and negative electrodes stacked alternatively with separators interposed therebetween in a casing material, such as a battery casing, together with an electrolyte. Any conventional methods for manufacturing a secondary battery may be used with no particular limitation.

In still another aspect, there are provided a battery module including the secondary battery as a unit cell, and a battery pack including the battery module. Since the battery module and battery pack include a secondary battery which shows excellent quick charging characteristics at a high loading amount, they may be used as power sources for electric vehicles, hybrid electric vehicles, plug-in hybrid electric vehicles and power storage systems.

Meanwhile, reference will be made to description about elements used conventionally in the field of a battery, particularly a lithium secondary battery, about other battery elements not described herein, such as a conductive material.

Hereinafter, the present disclosure will be explained in detail with reference to Examples. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

(1) Preparation of Negative Electrode Active Material

Silicon powder was mixed homogeneously with silicon dioxide (SiO$_2$) powder at a molar ratio of 1:1 and the resultant mixture was heat treated under reduced pressure atmosphere of 1 torr at 1,400° C. to prepare SiO$_x$ (0<x<2) gas. In addition, Mg was heat treated at 900° C. to prepare Mg gas.

The SiO$_x$ (0<x<2) gas was allowed to react with Mg gas at 1,300° C. and the reaction mixture was cooled to 800° C. within 4 hours to deposit the product. Then, the resultant product was pulverized with a jet mill to recover Mg-containing silicon oxide composite powder (primary particles) having an average particle diameter (D$_{50}$) of 1 μm.

Next, 100 parts by weight of the recovered primary particles were mixed with 6 parts by weight of pitch by using a mixer-type system (secondary particle formation system) equipped with internal rotation blades therein and having an exhaust line at 650° C. for 3 hours. The resultant mixture was fired at 950° C. under N$_2$ atmosphere for 2 hours to prepare secondary particles including a first carbon coating layer disposed partially or totally on the surfaces of the primary particles to interconnect and fix the primary particles.

The prepared secondary particles were subjected to chemical vapor deposition (CVD) by using a tubular electric furnace at 950° C. for 2 hours in the presence of a mixed gas of argon (Ar) with methane (CH$_4$) to obtain a negative electrode active material having a second carbon coating layer formed on the secondary particles. Herein, the content of the second carbon coating layer was 5 parts by weight based on 100 parts by weight of the secondary particles. The finished negative electrode active material had an average particle diameter (D$_{50}$) of 5 μm.

(2) Manufacture of Battery

The resultant negative electrode active material:conductive material (Super-C):lithium-polyacrylic acid (Li-PAA, lithium-substituted polyacrylic acid) were mixed in deionized water as a dispersion medium at a weight ratio of 8:1:1 to prepare negative electrode mixture layer slurry. The negative electrode mixture layer slurry was coated uniformly on both surfaces of a copper current collector having a thickness of 20 μm. The coating was carried out at a drying temperature of 80° C. and a coating rate of 0.2 m/min. Then, the negative electrode mixture layer was pressed to a porosity of 28% by using a roll press device to accomplish a target thickness. Then, drying was carried out in a vacuum oven at 130° C. for 8 hours to obtain a negative electrode.

Lithium foil having a thickness of 0.3 mm was used as a counter electrode and a porous film (30 μm, Celgard) made of polypropylene was used as a separator. The electrolyte was prepared by dissolving LiPF$_6$ in an organic solvent containing a mixture of ethylene carbonate with ethylmethyl carbonate at 3:7 (volume ratio) to a concentration of 1.0 M, and adding fluoroethylene carbonate (FEC) thereto at a concentration of 2 wt %. The separator was interposed between both electrodes and the electrolyte was injected thereto to obtain a so-called 2032 type coin-shaped half lithium secondary battery having a thickness of 2 mm and a diameter of 32 mm.

Comparative Example 1

Mg-containing silicon oxide composite powder having an average particle diameter ($D_{50}$) of 5 µm was used as primary particles, and 100 parts by weight of the primary particles were mixed simply with 6 parts by weight of pitch. Next, the resultant mixture was fired at 950° C. for 2 hours under $N_2$ atmosphere to form a first carbon coating layer on the primary particles. Then, the resultant product was subjected to chemical vapor deposition (CVD) by using a tubular electric furnace at 950° C. for 2 hours in the presence of a mixed gas of argon (Ar) with methane ($CH_4$) to obtain a negative electrode active material having a second carbon coating layer formed on the first carbon coating layer. In other words, unlike Example 1, no secondary particles were formed and the negative electrode active material according to Comparative Example 1 had a structure including the first carbon coating layer and the second carbon coating layer formed successively on the primary particles.

A negative electrode and a lithium secondary battery were obtained in the same manner as Example 1, except that the negative electrode active material obtained as described above was used.

Comparative Example 2

A negative electrode active material was obtained in the same manner as Example 1, except that the step of forming the second carbon coating layer on the secondary particles was not carried out.

A negative electrode and a lithium secondary battery were obtained in the same manner as Example 1, except that the negative electrode active material obtained as described above was used.

Comparative Example 3

A negative electrode active material was obtained in the same manner as Example 1, except that the primary particles were subjected to chemical vapor deposition (CVD) at 950° C. for 2 hours in the presence of a mixed gas of argon (Ar) with methane ($CH_4$) to obtain secondary particles having the first carbon coating layer on the primary particles, 100 parts by weight of the secondary particles were mixed with 6 parts by weight of pitch and then the resultant mixture was fired at 950° C. under $N_2$ atmosphere to form the second carbon coating layer on the surfaces of the secondary particles.

A negative electrode and a lithium secondary battery were obtained in the same manner as Example 1, except that the negative electrode active material obtained as described above was used.

Comparative Example 4

A negative electrode active material was obtained in the same manner as Example 1, except that Mg-containing silicon oxide composite powder having an average particle diameter ($D_{50}$) of 5 µm was used as primary particles to obtain a negative electrode active material having an average particle diameter ($D_{50}$) of 21.4 µm.

A negative electrode and a lithium secondary battery were obtained in the same manner as Example 1, except that the negative electrode active material obtained as described above was used.

TEST EXAMPLES

Test Example 1

Raman Spectroscopy

Raman spectroscopy was carried out in order to determine the crystallinity of the first carbon coating layer and that of the second carbon coating layer in the negative electrode active material according to Example 1.

Raman spectroscopy was carried out by using Renishaw 2000 Raman microscope system with 532 nm laser excitation, wherein a 100× optical lens was used at low laser output density for an exposure time of 30 seconds in order to avoid a laser heat effect. To reduce a deviation depending on position, total 25 points were determined per region of 5 µm×5 µm. After the determination, the average values are shown in FIG. 4 and the following Table 1.

TABLE 1

| | FWHM (full width at half-maximum) of G band ($cm^{-1}$) | FWHM (full width at half-maximum) of D band ($cm^{-1}$) |
|---|---|---|
| First carbon coating layer | 88.3 ± 5.52 | 105.6 ± 7.5 |
| Second carbon coating layer | 71.6 ± 2.64 | 63.9 ± 2.93 |

Figure 4:
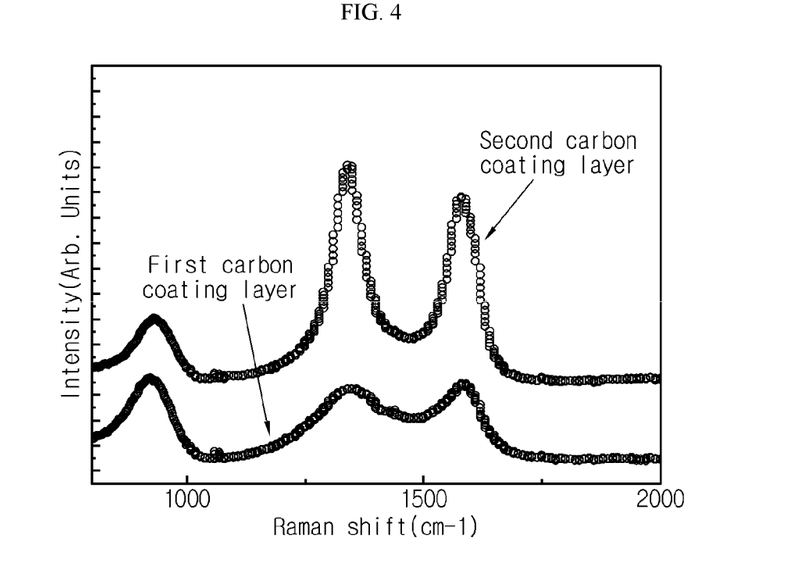
FIG. 4 is a graph illustrating the results of Raman spectroscopy illustrating the crystallinity of the first carbon coating layer in as compared to that of the second carbon coating layer in the negative electrode active material according to Example 1.

Referring to FIG. 4 and Table 1, it can be seen that after comparing FWHM values of G band (peaks near 1580 $cm^{-1}$) and D band (1350 $cm^{-1}$) of the first carbon coating layer with those of the second carbon coating layer, the first carbon coating layer formed by using pitch shows relatively lower crystallinity as compared to the second carbon coating layer formed by applying methane gas through CVD.

Test Example 2

Life Characteristics (Capacity Maintenance (%) After 100 Cycles)

Each of the lithium secondary batteries according to Example 1 and Comparative Examples 1-4 was charged at 0.1-C rate (charged in a 0.1C constant current mode, charged in a 0.005V constant voltage mode, 0.005C cut off) at room temperature (25° C.), and discharged at 0.1 C-rate (discharged in a 0.1C constant current mode, 1.5V cut off). The above procedure was repeated twice. Then, each lithium secondary battery was charged at 0.5 C-rate (charged in a 0.5C constant current mode, charged in a 0.005V constant voltage mode, 0.005C cut off) and discharged at 0.5C-rate (discharged in a 0.5C constant current mode, 1.5V cut off). The above procedure was repeated 98 times. Then, capacity maintenance was determined according to the following formula. The results are shown in the following Table 2.

Capacity maintenance (%)=[Discharge capacity at the $100^{th}$ cycle/Discharge capacity at the $2^{nd}$ cycle]×100

TABLE 2

| | Constitution of negative electrode material | Capacity maintenance after 100 cycles (%) |
|---|---|---|
| Ex. 1 | Secondary particles, First carbon coating layer: Pitch (fired), Second carbon coating layer: methane gas (CVD) coating | 75.4 |
| Comp. Ex. 1 | Primary particles, First carbon coating layer: Pitch (fired), Second carbon coating layer: methane gas (CVD) coating | 69.4 |
| Comp. Ex. 2 | Secondary particles with only pitch coating layer | 66.9 |
| Comp. Ex. 3 | Secondary particles, First carbon coating layer, Methane gas (CVD) coating Second carbon coating layer: Pitch (fired) | 53.1 |
| Comp. Ex. 4 | Increase in size of primary particles forming secondary particles First carbon coating layer: Pitch (fired), Second carbon coating layer: methane gas (CVD) coating | 46.2 |

It can be seen from Table 2 that the lithium secondary battery according to Example 1 having the negative electrode including the negative electrode active material according to the present disclosure shows a higher capacity maintenance after 100 cycles, as compared to the lithium secondary batteries according to Comparative Examples 1-4.

It can be also seen from the results that the lithium secondary battery according to the present disclosure has significantly improved life characteristics.

What is claimed is:

1. A negative electrode active material comprising:
secondary particles having a plurality of primary particles comprising a silicon oxide composite including
i) Si,
ii) a silicon oxide represented by $SiO_x$ (0<x≤2), and
iii) a metal silicate containing Si and a metal (M), wherein M comprises at least one of Li or Mg; and
a first carbon coating layer disposed partially or totally on the surfaces of the primary particles to interconnect and fix the primary particles; and
a second carbon coating layer disposed on an entire outer surfaces of the secondary particles,
wherein the second carbon coating layer has higher crystallinity as compared to the first carbon coating layer, and
the primary particles have an average particle diameter ($D_{50}$) of 0.1-3.5 μm.

2. The negative electrode active material according to claim 1, wherein a full width at half-maximum (FWHM) value of a D band in Raman spectroscopy of the first carbon coating layer is at least 1.3 times larger than the FWHM value of a D band in Raman spectroscopy of the second carbon coating layer.

3. The negative electrode active material according to claim 1, wherein an average particle diameter ($D_{50}$) of the negative electrode active material is 5-15 μm.

4. A method for preparing a negative electrode active material according to claim 1, comprising the steps of:
preparing a plurality of primary particles which include comprising a silicon oxide composite including i) Si, ii) a silicon oxide represented by $SiO_x$ (0<x≤2), and iii) a metal silicate containing Si and a metal (M), wherein M comprises at least one of Li or Mg;
mixing and firing the primary particles with a first carbonaceous material to prepare secondary particles having a first carbon coating layer disposed partially or totally on the surfaces of the primary particles to interconnect and fix the primary particles; and
injecting a second carbonaceous material gas into the secondary particles and carrying out heat treatment at 850-1,150° C. for 30 minutes to 8 hours to form a second carbon coating layer surrounding the secondary particles.

5. The method for preparing a negative electrode active material according to claim 4, wherein the step of preparing a plurality of primary particles comprises:
carrying out a reaction of $SiO_x$ (0<x<2) gas with at least one metal gas selected from Li and Mg, and cooling a reaction mixture at 400-900° C. to deposit a silicon oxide composite; and
pulverizing the deposited silicon oxide composite.

6. The method for preparing a negative electrode active material according to claim 5, wherein the $SiO_x$ (0<x<2) gas is prepared by allowing Si and $SiO_2$ to evaporate at 1,000-1,800° C., and the metal gas is prepared by allowing at least one metal selected from Li and Mg to evaporate at 800-1,600° C.

7. The method for preparing a negative electrode active material according to claim 4, wherein the step of mixing and firing the primary particles with the first carbonaceous material comprises the steps of:
mixing the primary particles with the first carbonaceous material to form secondary particle shapes and carrying out a low-temperature heat treatment at 600-700° C. for 2-6 hours; and
carbonizing a low-temperature heat treated product under a nitrogen atmosphere at a temperature of 900-1,200° C. for 0.5-8 hours.

8. A negative electrode comprising: a negative electrode current collector; and a negative electrode active material layer comprising the negative electrode active material according to claim 1, disposed on at least one surface of the negative electrode current collector.

9. A lithium secondary battery comprising the negative electrode according to claim 8.

10. The negative electrode active material according to claim 1, wherein the primary particles comprise a plurality of silicon phases comprising crystalline silicon and a matrix comprising the silicon oxide composite.

11. The negative electrode active material according to claim 10, wherein a crystallite size of the silicon phase is 15 nm or less.

12. The negative electrode active material according to claim 2, wherein the D band is a band appearing at about 1360 $cm^{-1}$, which is a peak representing $sp^3$ binding of the carbon coating layers.

13. The negative electrode active material according to claim 2, wherein the FWHM value of the D band of the first carbon coating layer is a 1.3-3 times larger than the FWHM value of the D band of the second carbon coating layer.

14. The negative electrode active material according to claim 2, wherein the FWHM value of the D band of the first carbon coating layer is a 1.3-2 times larger than the FWHM value of the D band of the second carbon coating layer.

15. The negative electrode active material according to claim 1, wherein a content of the first carbon coating layer is 3-15 parts by weight based on 100 parts by weight of the primary particles.

16. The negative electrode active material according to claim 1, wherein a content of the first carbon coating layer is 3-10 parts by weight based on 100 parts by weight of the primary particles.

17. The negative electrode active material according to claim 1, wherein a content of the first carbon coating layer is 3-8 parts by weight based on 100 parts by weight of the primary particles.

18. The negative electrode active material according to claim 1, wherein the metal (M) is present in an amount of 3-20 wt % based on 100 wt % of the silicon oxide composite.

19. The negative electrode active material according to claim 1, wherein the metal (M) is present in an amount of 4-15 wt % based on 100 wt % of the silicon oxide composite.

20. The negative electrode active material according to claim 1, wherein a 50% particle diameter (D50) of the primary particles is 0.1-3.5 μm.

* * * * *